(12) United States Patent
Okada et al.

(10) Patent No.: US 6,600,158 B1
(45) Date of Patent: Jul. 29, 2003

(54) SEMICONDUCTOR DEVICE AND RADIATION IMAGE PICKUP SYSTEM HAVING THE DEVICE

(75) Inventors: Satoshi Okada, Zama (JP); Chiori Mochizuki, Sagamihara (JP)

(73) Assignee: Canon Kabushiki Kaisha, Tokyo (JP)

(*) Notice: Subject to any disclaimer, the term of this patent is extended or adjusted under 35 U.S.C. 154(b) by 31 days.

(21) Appl. No.: 09/651,245

(22) Filed: Aug. 30, 2000

(30) Foreign Application Priority Data

Sep. 1, 1999 (JP) .......................................... 11-247932

(51) Int. Cl.[7] .................................................. G01T 1/20
(52) U.S. Cl. ................................. 250/370.11; 250/487.1
(58) Field of Search .......................... 250/370.11, 487.1

(56) References Cited

U.S. PATENT DOCUMENTS 5,066,611 A * 11/1991 Yu ............................... 438/632
5,255,302 A * 10/1993 Shimamune et al. .......... 378/55
5,401,668 A * 3/1995 Kwasnick et al. ....... 250/370.11
5,786,597 A * 7/1998 Lingren et al. ......... 250/370.09

FOREIGN PATENT DOCUMENTS

JP          01-318986 A    * 12/1989    ............ G01T/1/20

* cited by examiner

Primary Examiner—Constantine Hannaher
Assistant Examiner—Shun Lee
(74) Attorney, Agent, or Firm—Fitzpatrick, Cella, Harper & Scinto

(57) ABSTRACT

In order to prevent a wavelength converting member from being easily peeled off, a separation preventing layer is formed between a protective layer for protecting a photo-electric conversion element and the wavelength converting member.

15 Claims, 4 Drawing Sheets

SEMICONDUCTOR DEVICE AND RADIATION IMAGE PICKUP SYSTEM HAVING THE DEVICE

BACKGROUND OF THE INVENTION

1. Field of the Invention

The present invention relates to a semiconductor device and a radiation image pickup system having the semiconductor device, and particularly relates to a semiconductor device in which a separation preventing layer for preventing a protective layer and a scintillator from being separated from each other is formed between the protective layer and the scintillator, and a radiation image pickup system having the semiconductor device.

2. Related Background Art

In recent years, X-ray area sensors have been published by various companies in the development of filmless roentgenography. The systems of the X-ray area sensors are typically divided into a direct system and an indirect system. The direct system is of a type in which an X-ray is directly converted into an electric signal to be read. The indirect system is of a type in which an X-ray is once converted by a wavelength converting member into a radiation having a different wavelength such as visible light, etc., and the radiation with the converted wavelength (e.g., visible light) is then converted into an electric signal by a photoelectric conversion element sensitive to the converted wavelength to be read.

FIG. 1 is a schematic sectional view for explaining an example of an X-ray area sensor of the indirect system. In FIG. 1, reference numeral 401 denotes a substrate such as of glass; 402 a photoelectric converting portion such as an MIS type photosensor using amorphous silicon; and 403 a TFT switch portion. Reference numeral 411 denotes a protective layer of a nitride, etc.; 421 a scintillator of cesium iodide (CsI), etc. as a wavelength converting member; and 422 a reflective film of aluminum, etc.

With the X-ray area sensor shown in FIG. 1, the photosensor portion (photoelectric converting portion) 402, the TFT switch portion 403 and the protective layer 411 are normally formed on the glass substrate 401; the scintillator 421 comprised of cesium iodide, etc. is directly evaporated on the protective layer 411: and the reflective film 422 is directly evaporated or adhered (no adhesive layer is illustrated) onto the scintillator 421, thus completing the X-ray area sensor.

When an X-ray is made incident on the thus completed X-ray area sensor from the upper side in FIG. 1, the X-ray passes through the reflective film 422 and is absorbed by the scintillator 421. The scintillator 421 absorbing the X-ray emits visible light within a bulk in all directions. At this time, since in the scintillator 421 comprised of cesium iodide, crystals are grown in columnar shapes as shown in FIG. 1, the light emitted within the bulk is finally advanced in the columnar direction as in the principle of an optical fiber while being reflected at grain boundaries, and almost all of the light is converged to the photosensor portion 402 and the TFT switch portion 403 located on the lower side in FIG. 1. Therefore, the photosensitivity and resolution can be improved.

As described above, with the X-ray area sensor, the scintillator may be directly evaporated on the protective layer, and in particular, cesium iodide as a material of the scintillator is formed by evaporation so as to obtain the characteristics of the columnar crystals. However, because the bonding force of cesium iodide to a substance of a low thermal conductivity is small, the bonding of cesium iodide to such a substance is subject to peeling off, thus resulting in separation. The protective layer is generally made of a substance of a low thermal conductivity. Accordingly, with the configuration shown in FIG. 1, since the bonding force of the scintillator and the protective layer is small, the scintillator and the protective layer may be separated from each other due to peeling off. Therefore, there has been a room for improvement in impact resistance and reliability in a semiconductor device having an X-ray area sensor.

The protective layer also has a function of maintaining the device characteristics, blocking diffusion of an impurity from cesium iodide to the photoelectric converting portion, the switch portion, etc., and preventing penetration of water from the outside. However, if the bonding force of the protective layer and the scintillator is small, the freedom of choice of the material for the protective layer may be reduced, thus placing restrictions on design and manufacture of X-ray area sensors.

SUMMARY OF THE INVENTION

An object of the present invention is to provide a semiconductor device having a structure in which a wavelength converting member is difficult to be separated from the main body of the semiconductor device.

Further, another object of the present invention is to provide a semiconductor device with excellent impact resistance and reliability.

According to the present invention, there is provided a semiconductor device comprising a photoelectric converting portion, a protective layer provided on the photoelectric converting portion, a wavelength converting member provided on the protective layer, and a separation preventing layer provided between the protective layer and the wavelength converting member.

According to the present invention, there is also provided a radiation image pickup system comprising the above mentioned semiconductor device, a signal processing means for processing a signal from the semiconductor device, a recording means for recording a signal from the signal processing means, a display means for displaying a signal from the signal processing means, a transfer means for transferring a signal from the signal processing means, and a radiation source for irradiating the semiconductor device with a radiation.

DESCRIPTION OF THE PREFERRED EMBODIMENTS

Figure 1:
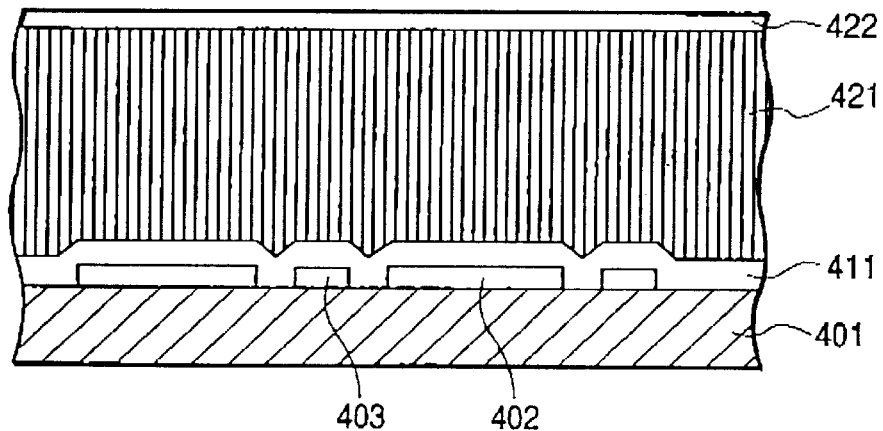
FIG. 1 is a schematic sectional view of a semiconductor device.
Figure 2:
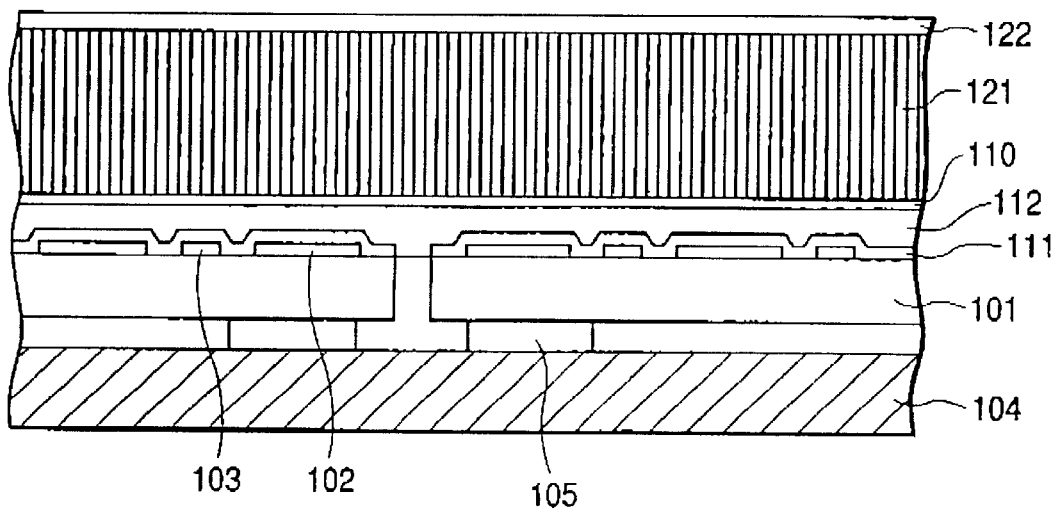
FIG. 2 is a schematic sectional view of a semiconductor device.

FIG. 2 is a view illustrating a preferred example of the semiconductor device of the present invention, specifically a schematic sectional view showing a portion of the semiconductor device formed by bonding a plurality of X-ray area sensor panels to a base in a plane direction, and more specifically an enlarged sectional view of a portion where the X-ray area sensor panels are adjacent to each other. In FIG. 2, reference numeral 104 denotes a base made of glass, etc.; 105 an adhesive layer for bonding the base 104 and a glass substrate 101 to each other; 102 a photoelectric converting portion having an MIS type photosensor using, e.g., amorphous silicon, or the like; 103 a switch portion such as a TFT (thin film transistor), etc; 111 a first protective layer made of a nitride, etc. for protecting the switch portion 103 electrically and/or from impurities; 112 a second protective layer made of an organic material such as PI (polyimide), etc. for forming a scintillator 121 flatwise; 121 the scintillator as a wavelength converting member such as cesium iodide (CsI) which may be doped with thallium (Tl), etc., or the like; 122 a reflective film made of aluminum (Al), etc.; and 110 a separation preventing layer of a transparent conductive layer such as of ITO, etc.

The bonding force of cesium iodide to the second protective layer 112 of a low thermal conductivity is small. Therefore, when cesium iodide is bonded to such a substance, i.e., when cesium iodide is directly formed on the second protective layer 112, cesium iodide is subject to separation by peeling off. On the other hand, the bonding force of cesium iodide to a material of a high thermal conductivity such as a metal is large. Therefore, in the present example, the separation preventing layer 110 is provided between the scintillator 121 and the second protective layer 112 to prevent the scintillator 121 and the second protective layer 112 from being peeled off and separated from each other.

As a method for forming the separation preventing layer 110, there can be used a general thin film forming method such as sputtering or the like. It is preferable to effect evaporation at a substrate temperature within the range of 200° C. or less in which deterioration of the element can be restrained. A metal compound may be also used for the separation preventing layer 110. These materials preferably have a thermal conductivity of 2.0 w/m·k or more.

Specifically, it is desirable to select one of the transparent materials such as antimony sulfide ($Sb_2S_3$), iron oxide ($Fe_2O_3$), titanium oxide ($TiO_2$), cadmium sulfide (CdS), cerium oxide ($CeO_2$), zinc sulfide (ZnS), lead chloride ($PbCl_2$), cadmium oxide (CdO), antimony oxide ($Sb_2O_3$), tungsten oxide ($WO_3$), bismuth oxide ($Bi_2O_3$), aluminum oxide ($Al_2O_3$), calcium oxide (CaO), calcium fluoride ($CaF_2$), lithium fluoride (LiF), magnesium fluoride ($MgF_2$), sodium fluoride (NaF), aluminum fluoride ($AlF_3$), etc.

The scintillator 121 can also be grown so as to have a columnar structure under the temperature condition of 200° C. or less. When the scintillator 121 is evaporated on the separation preventing layer 110, the bonding force is improved in comparison with the case where the scintillator is evaporated directly on the second protective layer 112. Because the separation preventing layer 110 is optically transparent, the light generated in the scintillator 121 reaches the photosensor portion 102 without any substantial loss.

When the configuration as shown in FIG. 2 is employed, it becomes possible to arrange a plurality of sensor panels in a plane direction, then flatten the surfaces thereof by the second protective layer 112, and uniformly evaporate the scintillator 121 on the flattened surfaces. Further, providing the separation preventing layer 110 on the second protective layer 112 can strengthen the bonding force of the scintillator 121. Since the flattening of the surface can be attained by the second protective layer 112, the scintillator 121 can be formed under more preferable conditions.

Further, since the provision of the separation preventing layer 110 can improve the bonding force of the scintillator 121, the freedom of choice of the material for the second protective layer 112 can be increased. Moreover, since the material for the protective film can be selected irrespective of the bonding force to cesium iodide as a material of the scintillator 121, the freedom of choice of the material for the first protective layer 111 can be also increased. Accordingly, for example, an organic resin, etc. of a low thermal conductivity can be also selected as the material of the first protective layer 111. Needless to say, it is not necessarily required to use plural sensor panels, and a single large area sensor panel may also be used.

Figure 3:
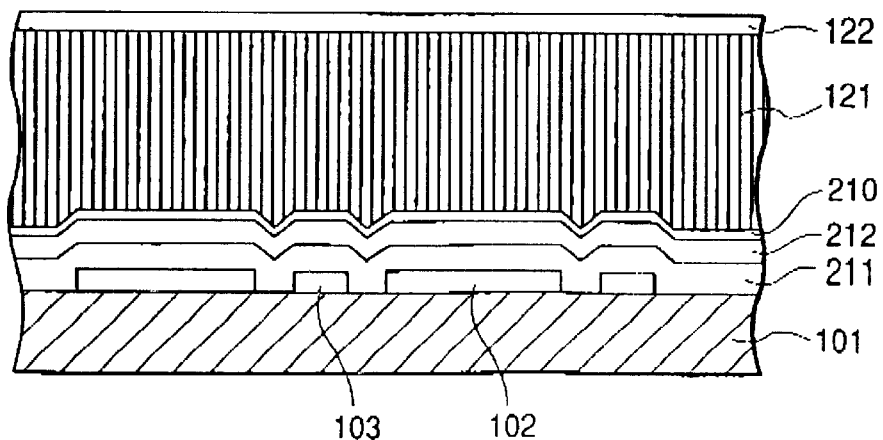
FIG. 3 is a schematic sectional view of a semiconductor device.

FIG. 3 is a schematic sectional view illustrating another preferred example of the semiconductor device of the present invention. Reference numeral 211 denotes a first protective layer made of silicon nitride having a composition rich in silicon than the stoichiometric composition, or the like; 212 a second protective layer made of a stoichiometry-like nitride; and 210 a separation preventing layer of chromium. Members similar to those shown in FIG. 2 are designated by the same reference numerals.

As a method for forming the separation preventing layer 210, there can be used a general thin film forming method such as sputtering or the like. It is preferable to effect evaporation at a substrate temperature within the range of 200° C. or less in which deterioration of the already formed element can be restrained. Further, so as not to lower the transmittance of light by the provision of the separation preventing layer 210, it is preferable that the separation preventing layer is as thin as possible. When the separation preventing layer 210 is formed of a metal material, it is most preferable for securing the transmittance of light that the thickness of the metal layer is not less than a minimum thickness required for connecting clusters to each other at an initial stage of evaporation and is as thin as possible.

The scintillator 121 is grown in a columnar structure also under the temperature condition of 200° C. or less. The first protective layer 211 is formed to electrically protect the TFT switch portion 103, but is small in moisture resistance and blocking property of impurities.

On the other hand, the second protective layer 212 is approximately stoichiometrically bonded and is therefore large in moisture resistance and blocking property of impurities. Further, since the scintillator 121 is evaporated on the second protective layer 212 with the separation preventing layer 210 therebetween, the scintillator 121 will not be separated.

Figure 4A:
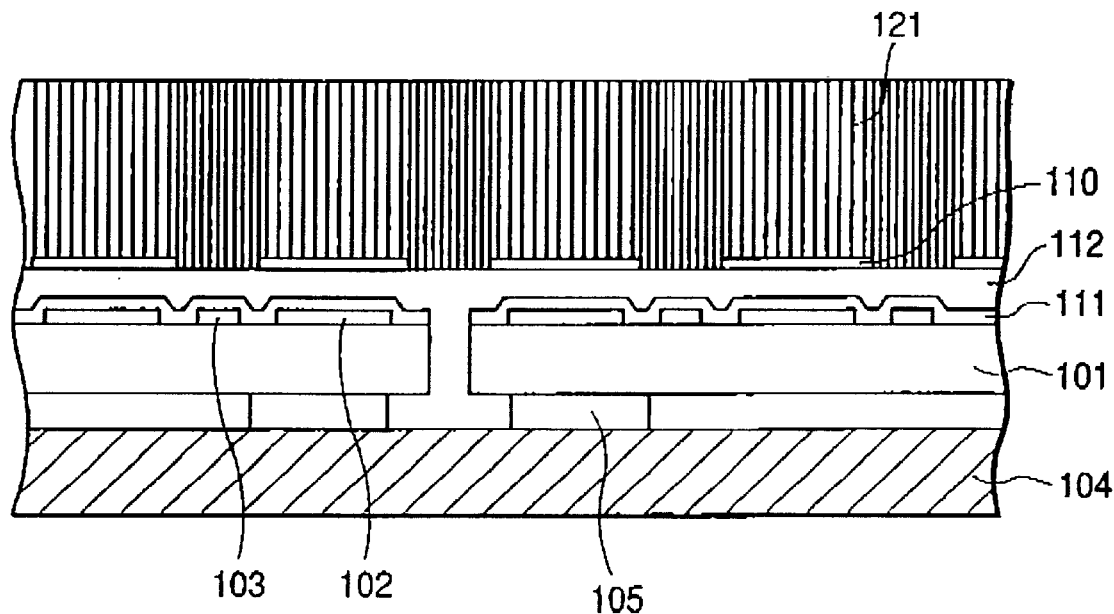
FIG. 4A is a schematic sectional view of a semiconductor device during manufacturing process.
Figure 4B:
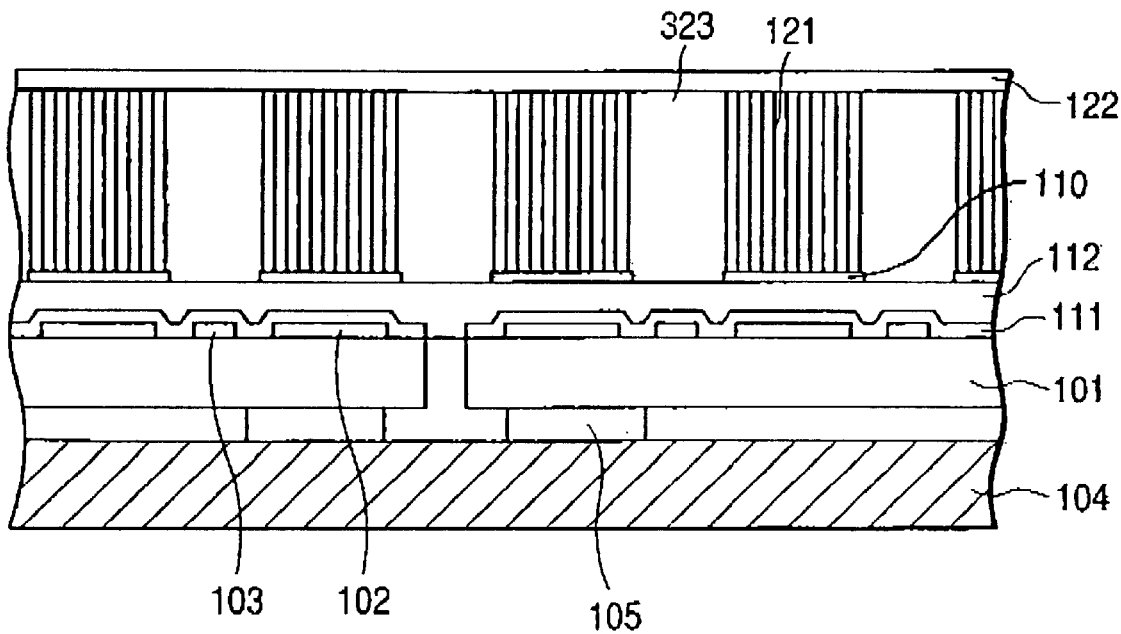
FIG. 4B is a schematic sectional view of a semiconductor device.

FIGS. 4A and 4B are process views illustrating another preferred example of the semiconductor device of the present invention, specifically schematic sectional views illustrating production steps of the semiconductor device formed by bonding a plurality of X-ray area sensor panels in a plane direction. FIG. 4A is a schematic sectional view showing the state just after the formation of the scintillator 121 by evaporation of cesium iodide, etc. FIG. 4B is a schematic sectional view of the semiconductor device as completed by removing the scintillator 121 except above the separation preventing layer 110, then filling the removed portion with a filler 323, and forming a reflective film 122 on the scintillator 121 and the filler 323. Members similar to those shown in FIG. 2 are designated by the same reference numerals.

As a method for forming the separation preventing layer 110, there can be used a general thin film forming method such as sputtering or the like, as is the case with the above mentioned examples. Also in the present example, it is preferable to effect evaporation at a substrate temperature within the range of 200° C. or less in which deterioration of the photosensor portion 102 and the TFT switch portion 103 can be restrained. Thereafter, this evaporated film is patterned in a desired shape via the photolithography process. Thereafter, the scintillator 121 is grown in a columnar structure also under the temperature condition of 200° C. or less. In the present example, the bonding force of the scintillator 121 grown on the separation preventing layer 110 is larger than that of the scintillator 121 grown on the second protective layer 112. Therefore, the scintillator 121 on the second protective layer 112 with a small bonding force can be then removed therefrom by applying a physical force to the scintillator 121. In the present example, the evaporated film for forming the separation preventing layer on the TFT switch portion 103 is removed.

Thereafter, the filler 323 is flowed into a portion where the scintillator 121 is removed, and the portion is filled with the filler 323. Thereafter, the reflective film 122 is formed entirely on the scintillator 121 and the filler 323 to complete the semiconductor device as shown in FIG. 4B. Since the separation preventing layer 110 is optically transparent (or substantially transparent), the light generated in the scintillator 121 reaches the photosensor portion 102 without any special loss.

As shown in FIG. 4B, when the scintillator 121 is formed only on the separation preventing layer 110, since no light is emitted from the scintillator on the TFT switch portion 103, no or substantially no light is incident on the TFT switch portion 103. Therefore, a rise in OFF-state current can be restrained. It is also possible to further improve the effects by making the filler 323 not light transmissive or slightly light transmissive by incorporating a pigment in the resin or coloring the resin. Further, in the present example, after the plural sensor panels are arranged in the plane direction, the scintillator 121 is flattened by the second protective layer 112. Thus, the scintillator 121 can be formed under more preferable conditions. Needless to say, a single large area sensor panel may also be used.

Next, an example of an X-ray image pickup system having the above described semiconductor device will be explained.

Figure 5A:
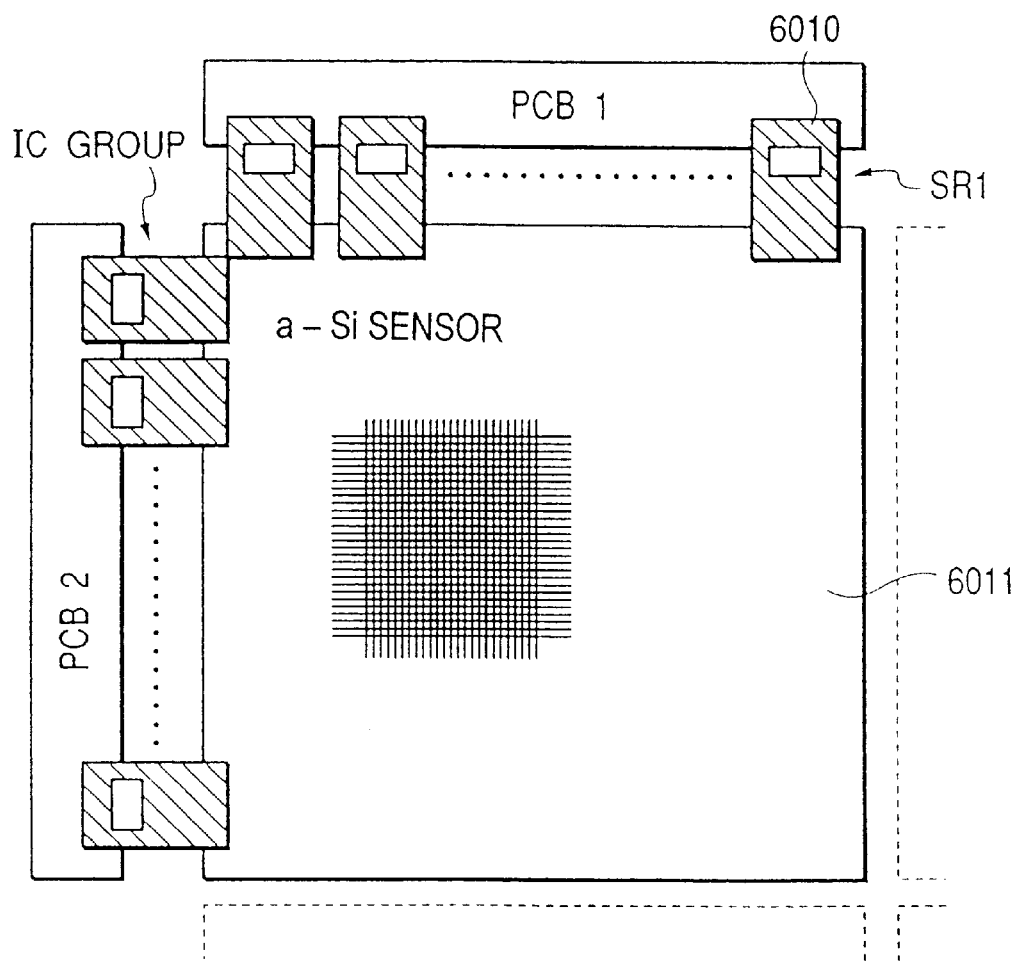
FIG. 5A is a schematic plan view of a semiconductor device when applied to an X-ray image pickup device.
Figure 5B:
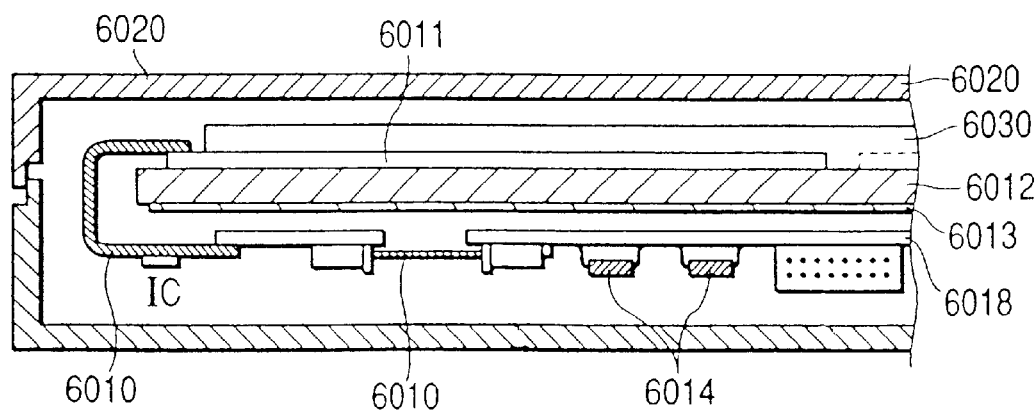
FIG. 5B is a schematic sectional view of the semiconductor device when applied to the X-ray image pickup device.

FIGS. 5A and 5B are a schematic, structural view and a schematic, cross-sectional view of an X-ray image pickup device comprising the above semiconductor device. First, the constitution of the X-ray image pickup device will be described. A plurality of photoelectric conversion elements and transistors are formed in each sensor substrate 6011. Flexible circuit boards 6010 equipped with drivers SR1 and integrated circuits for detection IC are connected to each sensor substrate.

The other sides of the flexible circuit boards 6010 are connected to printed-circuit board PCB1, PCB2. A plurality of sensor substrates 6011 are bonded on the base 6012. Further, a lead sheet 6013 for protecting memories 6014 of processing unit 6018 from X-rays is mounted on the bottom of the base 6012 constituting the large semiconductor device.

The wavelength converting member 6030 (comprising, e.g., CsI) for converting, e.g., X-rays to visible light is provided on the sensor substrates 6011. The above mentioned semiconductor device comprises the sensor substrates 6011 and wavelength converting member 6030, which are used to detect X-rays. In the present example the whole is housed in a case 6020 of carbon fiber, as illustrated in FIG. 5B.

Next, an X-ray image pickup (or imaging) system using the X-ray image pickup device will be described.

Figure 6:
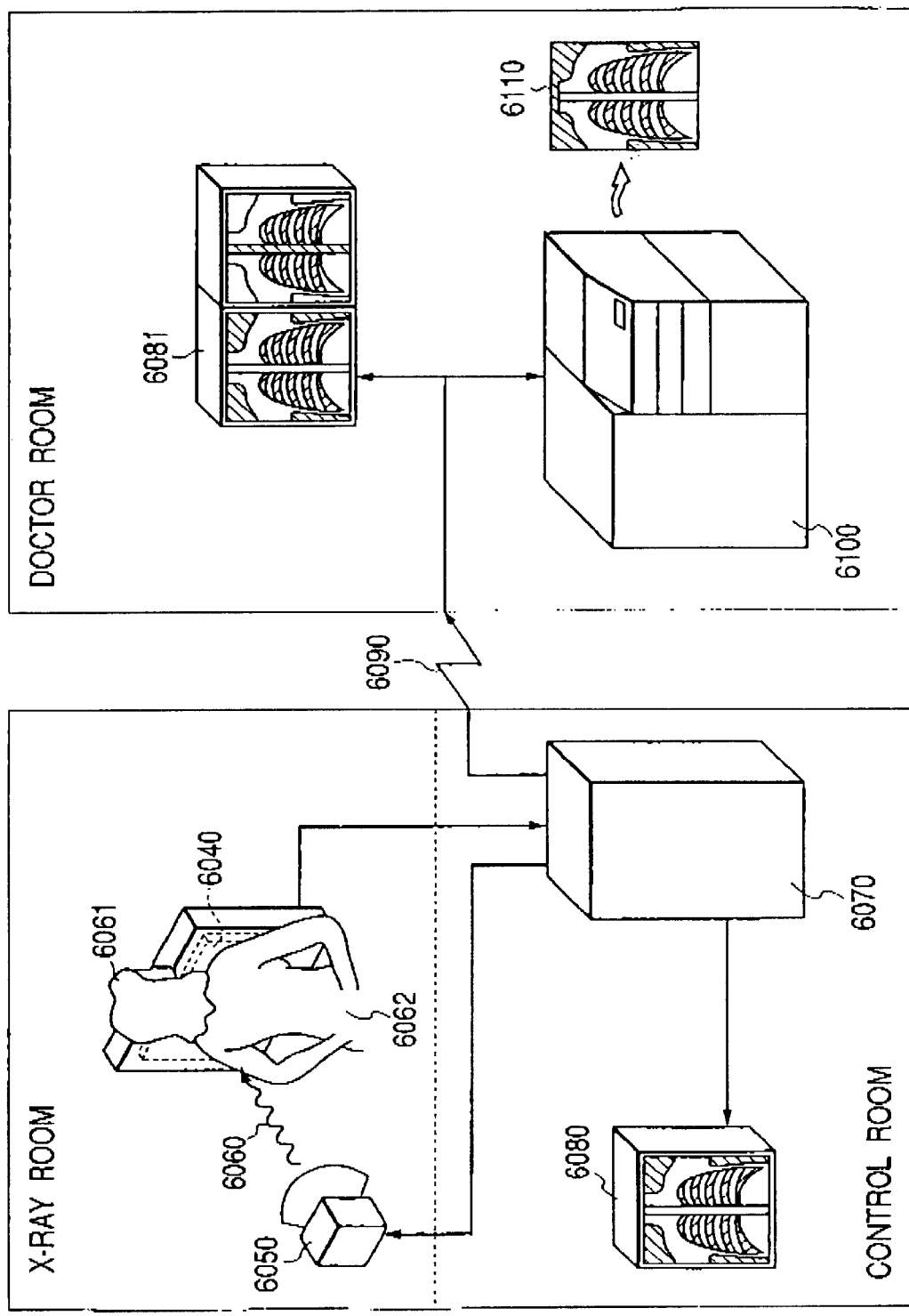
FIG. 6 is a schematic structural view illustrating an X-ray diagnostic system using an X-ray image pickup device.

FIG. 6 is a view showing an example of application of the X-ray image pickup device of the present invention to an X-ray diagnosis system.

X-rays 6060 generated in an X-ray tube 6050 pass through a diagnosed part 6062 such as the chest part of a patient or subject 6061 and is then incident on an photoelectric conversion device (X-ray image pickup device) 6040 having a scintillator as a wavelength converting member mounted on the upper part thereof. The incident X-rays contain internal information of the subject 6061. In correspondence to the incidence of X-rays the scintillator emits light, which is photoelectrically converted to provide an electrical information. This information is converted to digital signals, which are picture-processed in a picture processor 6070 to be observed on a display 6080 in a control room.

Further, this information can be transferred to a distant place, etc. by a transfer means 6090 such as a telephone line, a wireless installation or the like and can be also displayed in a display 6081 in a doctor room, etc. in another place, or a doctor in a distant place can diagnose the patient by the output of a film, etc. The obtained information can be also recorded and stored by a recording means 6100 such as a film processor, etc. in a recording medium using various kinds of recording materials such as an optical disk, a magneto-optical disk, and a magnetic disk, and a recording medium 6110 such as a film, paper, etc.

The above described X-ray image pickup device is not particularly limited to the use for a medical instrument, but can be also used in a non-destructive inspection, etc. Further, the X-ray image pickup device can be applied to an image pickup system for picking-up an image of radiation such as α, β and γ rays, in addition to the X-ray. In this case, it is sufficient for the scintillator to convert the radiation to an electromagnetic wave (e.g., visible light) having a wavelength within a wavelength range that can be detected by a photoelectric conversion element.

As described above, according to the present invention, it is possible to provide a semiconductor device of a structure in which a wavelength converting member is difficult to be separated from a main body of the semiconductor device. Thus, the freedom of choice of the material for a protective layer is increased.

Further, according to the present invention, it is possible to provide a semiconductor device having high reliability and excellent impact resistance.

What is claimed is:

1. A semiconductor device comprising:
   a photoelectric converting portion;
   a protective layer provided on the photoelectric converting portion, to provide a flat surface over the photoelectric converting portion;
   a wavelength converting member provided on the protective layer; and
   a separation preventing layer provided between the protective layer and the wavelength converting member.

2. The semiconductor device according to claim 1, wherein the separation preventing layer is a metal or metal compound layer.

3. The semiconductor device according to claim 2, wherein the metal or metal compound layer comprises a material of a thermal conductivity of 2.0 W/m·K or more.

4. The semiconductor device according to claim 2, wherein the metal layer comprises at least one element selected from the group consisting of chromium, aluminum, molybdenum, titanium and tantalum.

5. The semiconductor device according to claim 2, wherein the metal compound layer comprises at least one of a transparent conductive layer, antimony sulfide ($Sb_2S_3$) layer, iron oxide ($FeO_3$) layer, titanium oxide ($TiO_2$) layer, cadmium sulfide (CdS) layer, cerium oxide ($CeO_2$) layer, zinc sulfide (ZnS) layer, lead chloride ($PbCl_2$) layer, cadmium oxide (CdO) layer, antimony oxide ($Sb_2O_3$) layer, tungsten oxide ($WO_3$) layer, bismuth oxide ($Bi_2O_3$) layer, aluminum oxide ($Al_2O_3$) layer, calcium oxide (CaO) layer, calcium fluoride ($CaF_2$) layer, lithium fluoride (LiF) layer, magnesium fluoride ($MgF_2$) layer, sodium fluoride (NaF) layer, and aluminum fluoride ($AlF_3$) layer.

6. The semiconductor device according to claim 1, wherein the wavelength converting member comprises a scintillator.

7. The semiconductor device according to claim 1, wherein the wavelength converting member comprises cesium iodide.

8. The semiconductor device according to claim 7, wherein the cesium iodide comprises a columnar crystal.

9. The semiconductor device according to claim 1, wherein the photoelectric converting portion comprises a photoelectric conversion element.

10. The semiconductor device according to claim 1, wherein the separation preventing layer is provided over the entirety of a substrate having the photoelectric converting portion formed thereon.

11. The semiconductor device according to claim 1, wherein the separation preventing layer is patterned.

12. The semiconductor device according to claim 1, wherein the separation preventing layer is provided over the entirety of a substrate having the photoelectric converting portion formed thereon, except above a switch portion.

13. The semiconductor device according to claim 12, further comprising a filler provided on the switch portion.

14. The semiconductor device according to claim 13, wherein the filler has no or substantially no light transmittance.

15. A radiation image pickup system comprising:

a semiconductor device as set forth in claim 1;

a signal processing means for processing a signal from the semiconductor device;

a recording means for recording a signal from the signal processing means;

a display means for displaying a signal from the signal processing means;

a transfer means for transferring a signal from the signal processing means; and a radiation source for irradiating the semiconductor device with a radiation.

* * * * *